(12) United States Patent
Brown (10) Patent No.: US 9,898,786 B2
(45) Date of Patent: Feb. 20, 2018

(54) SEMI-TRACTOR TRAILER FOR DISTRIBUTION OF NATURAL GAS AND SYSTEM AND METHOD FOR USE OF SAME

(71) Applicant: William Lamont Brown, Denton, TX (US)

(72) Inventor: William Lamont Brown, Denton, TX (US)

(*) Notice: Subject to any disclaimer, the term of this patent is extended or adjusted under 35 U.S.C. 154(b) by 738 days.

(21) Appl. No.: 14/335,364

(22) Filed: Jul. 18, 2014

(65) Prior Publication Data

US 2014/0330657 A1 Nov. 6, 2014

Related U.S. Application Data

(62) Division of application No. 14/043,552, filed on Oct. 1, 2013, now Pat. No. 8,807,599.

(Continued)

(51) Int. Cl.

| | |
|---|---|
| *B60P 3/22* | (2006.01) |
| *G06Q 50/06* | (2012.01) |
| *G06Q 20/20* | (2012.01) |
| *G06Q 50/30* | (2012.01) |
| *G06Q 30/00* | (2012.01) |
| *G09F 21/04* | (2006.01) |
| *G06Q 10/08* | (2012.01) |
| *G06Q 10/06* | (2012.01) |
| *G06Q 40/02* | (2012.01) |
| *G07C 5/00* | (2006.01) |

(52) U.S. Cl.
CPC .............. *G06Q 50/06* (2013.01); *B60P 3/228* (2013.01); *G06Q 10/06313* (2013.01); *G06Q 10/08* (2013.01); *G06Q 20/203* (2013.01); *G06Q 20/204* (2013.01); *G06Q 30/00* (2013.01); *G06Q 40/025* (2013.01); *G06Q 50/30* (2013.01); *G07C 5/008* (2013.01); *G09F 21/048* (2013.01)

(58) Field of Classification Search
CPC ....... G06Q 30/00; G06Q 50/30; G06Q 20/203
See application file for complete search history.

(56) References Cited

U.S. PATENT DOCUMENTS

| | | |
|---|---|---|
| 3,814,148 A | 6/1974 | Wostl |
| 4,911,330 A | 3/1990 | Vlaanderen et al. |

(Continued)

FOREIGN PATENT DOCUMENTS

WO WO2012099469 A1 7/2012

*Primary Examiner* — Talia Crawley
(74) *Attorney, Agent, or Firm* — Scott T. Griggs; Griggs Bergen LLP (57) ABSTRACT

A semi-tractor trailer for distribution of natural gas and a system and method for use of the same are disclosed. In one embodiment, a semi-tractor trailer supported fuel receptacle has a plurality of metered fuel dispensers along the sides thereof to permit customers to park along side the semi-tractor trailer and fuel their vehicles with clean natural gas, which may be compressed natural gas or liquid natural gas, for example. The semi-tractor trailer is filled at a central filling location and transported by a tractor to a convenient retail location. A volume monitor monitors the volume of clean natural gas in the semi-tractor trailer and transmits this information to the central filling location, which may dispense a replacement semi-tractor trailer upon the volume of clean natural gas reaching a pre-determined threshold and retrieve the spent semi-tractor trailer in one trip.

15 Claims, 4 Drawing Sheets

Related U.S. Application Data

(60) Provisional application No. 61/708,108, filed on Oct. 1, 2012.

(56) References Cited

U.S. PATENT DOCUMENTS

| | | | | |
|---|---|---|---|---|
| 4,988,020 | A | * | 1/1991 | Webb .................. B60S 5/02 |
| | | | | 141/88 |
| 5,365,980 | A | | 11/1994 | DeBerardinis |
| 5,507,326 | A | | 4/1996 | Cadman et al. |
| 5,983,962 | A | * | 11/1999 | Gerardot ............ B60P 3/224 |
| | | | | 141/231 |
| 6,152,197 | A | * | 11/2000 | Gerardot ............ B60P 3/224 |
| | | | | 141/2 |
| 6,339,996 | B1 | | 1/2002 | Campbell |
| 7,168,465 | B2 | * | 1/2007 | Mitlitsky ............ C25B 15/08 |
| | | | | 141/231 |
| 2003/0148153 | A1 | * | 8/2003 | Mitlitsky ............ C25B 15/08 |
| | | | | 141/131 |
| 2005/0212281 | A1 | * | 9/2005 | Gore .................. B60K 15/063 |
| | | | | 280/837 |
| 2008/0071596 | A1 | * | 3/2008 | Smith .................. G06Q 40/00 |
| | | | | 705/1.1 |
| 2010/0119890 | A1 | * | 5/2010 | Frisbie ............ H01M 8/0662 |
| | | | | 429/408 |
| 2013/0073450 | A1 | * | 3/2013 | Swan .................. G06Q 40/00 |
| | | | | 705/39 |
| 2013/0180265 | A1 | * | 7/2013 | Lee .................... B60H 1/3232 |
| | | | | 62/49.1 |
| 2013/0218755 | A1 | | 8/2013 | Etchegoyen |
| 2013/0240080 | A1 | * | 9/2013 | Pick .................... B67D 7/04 |
| | | | | 141/4 |
| 2014/0091564 | A1 | | 4/2014 | Brown |

* cited by examiner

SEMI-TRACTOR TRAILER FOR DISTRIBUTION OF NATURAL GAS AND SYSTEM AND METHOD FOR USE OF SAME

PRIORITY STATEMENT AND CROSS-REFERENCE TO RELATED APPLICATIONS

This application claims priority from co-pending U.S. patent application Ser. No. 14/043,552 entitled "Semi-Tractor Trailer for Distribution of Natural Gas and System and Method for Use of Same" and filed on Oct. 1, 2013 in the name of William Lamont Brown; which claims priority from U.S. Patent Application No. 61/708,108 entitled "System and Method for Facilitating the Clean Natural Gas Industry" and filed on Oct. 1, 2012 in the name of William Lamont Brown; which are hereby incorporated by reference for all purposes.

TECHNICAL FIELD OF THE INVENTION

This invention relates, in general, to the clean natural gas industry and, in particular, to a tractor trailer and system and method for use of the same, including a business methodology, for facilitating the growth of the clean natural gas industry and related economy.

BACKGROUND OF THE INVENTION

The oil and natural gas industry contributes significantly to the U.S. economy as one of the nation's largest employers and purchasers of goods. Even in a struggling economy, America's oil and natural gas companies continue to provide well-paying jobs, revenue to governments and investment growth for millions of Americans. With respect to natural gas, in particular, clean-burning natural gas is critical for heating households, fueling our country's transportation needs and supporting American manufacturing jobs. Clean natural gas also means that energy-intensive manufacturing companies, which had been moving overseas for cheaper energy, can stay here in the United States as well as the related jobs, higher incomes, and a better future for all Americans. That is, as new and improved ways are found to grow the clean natural gas industry, America will grow. Accordingly, there continues to be an urgent need for systems and methods for growing the clean natural gas industry.

SUMMARY OF THE INVENTION

It would be advantageous to achieve systems and methods for growing the clean natural gas industry utilizing current infrastructure, such as existing highways, for example, which would increase the availability of domestic clean natural gas. It would also be desirable to enable electro-mechanical and computer-based solutions that would mitigate or eliminate dependence on gasoline and increase dependence on more secure and less expensive energy sources. Further still, it would be desirable to enable solutions that would increase the dynamics of fuel distribution. To better address one or more of these concerns, a semi-tractor trailer for distribution of natural gas and a system and method for use of the same are disclosed. In one embodiment, a semi-tractor trailer supported fuel receptacle has a plurality of metered fuel dispensers along the sides thereof to permit customers to park alongside the semi-tractor trailer and fuel their vehicles with clean natural gas, which may be compressed natural gas or liquid natural gas, for example. The semi-tractor trailer is filled at a central filling location and transported by a tractor to a convenient retail location. A volume monitor monitors the volume of clean natural gas in the semi-tractor trailer and transmits this information to the central filling location, which may dispense a replacement semi-tractor trailer upon the volume of clean natural gas reaching a pre-determined threshold and retrieve the spent semi-tractor trailer in one trip. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
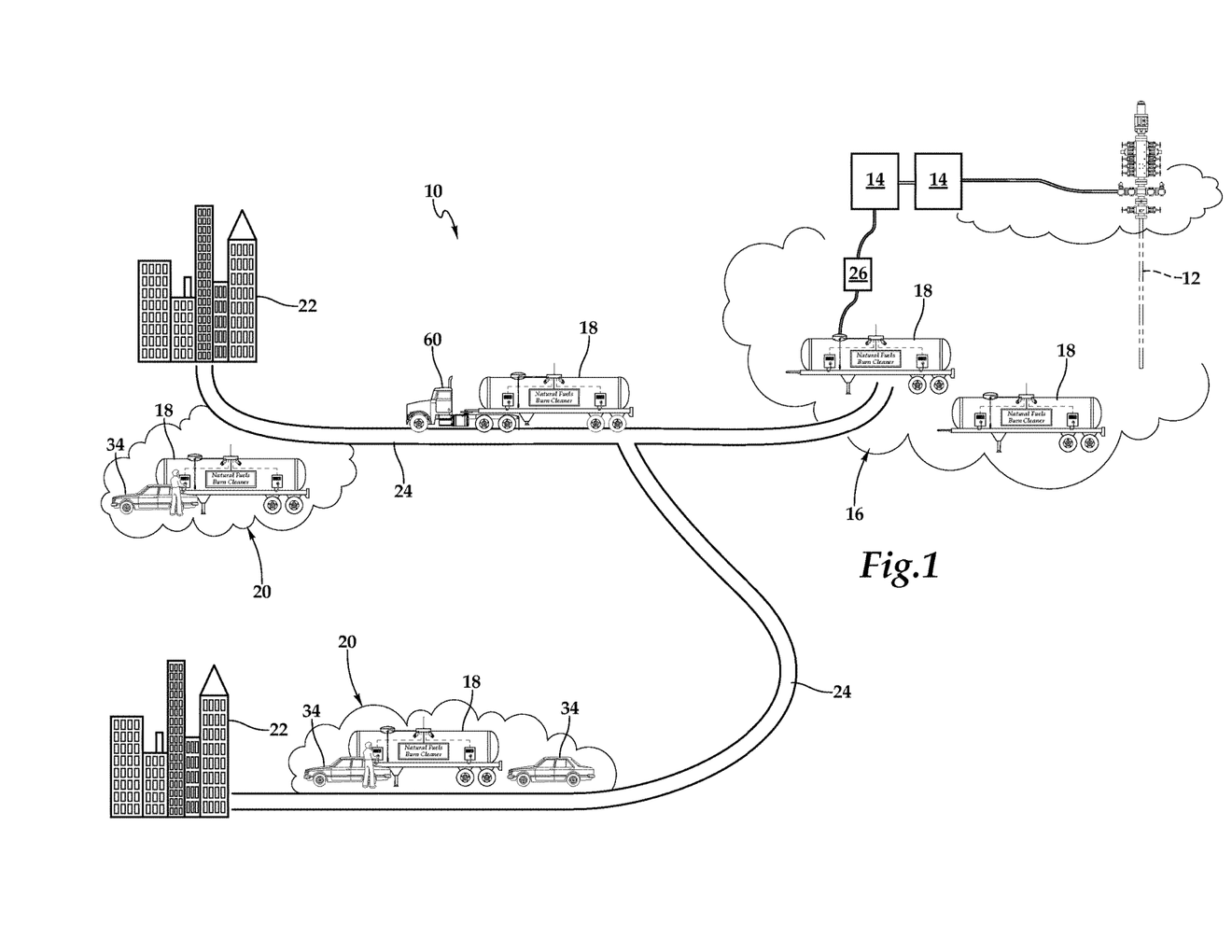
FIG. 1 is a schematic block diagram illustrating one embodiment of a system for utilizing a semi-tractor trailer for distributing clean natural gas according to the teachings presented herein.
Figure 2A:
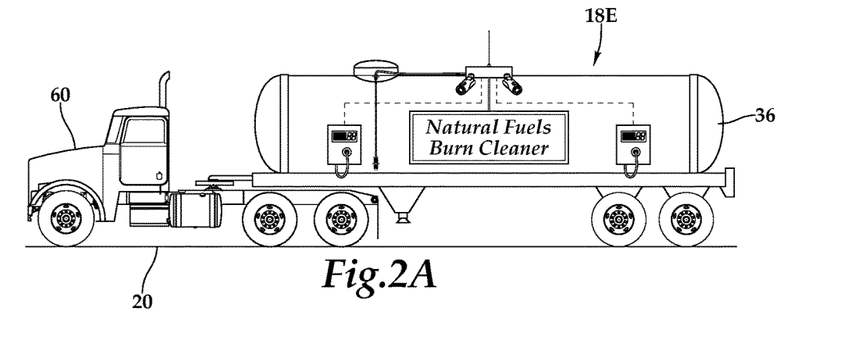
FIG. 2A is a partial side elevation view illustrating one embodiment of a refilling station employing the semi-tractor trailers depicted in FIG. 1.
Figure 2B:
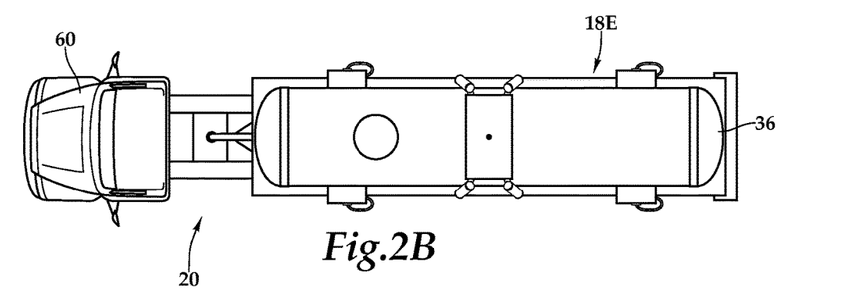
FIG. 2B is a partial top plan view illustrating one embodiment of the refilling station depicted in FIG. 2A.
Figure 2C:
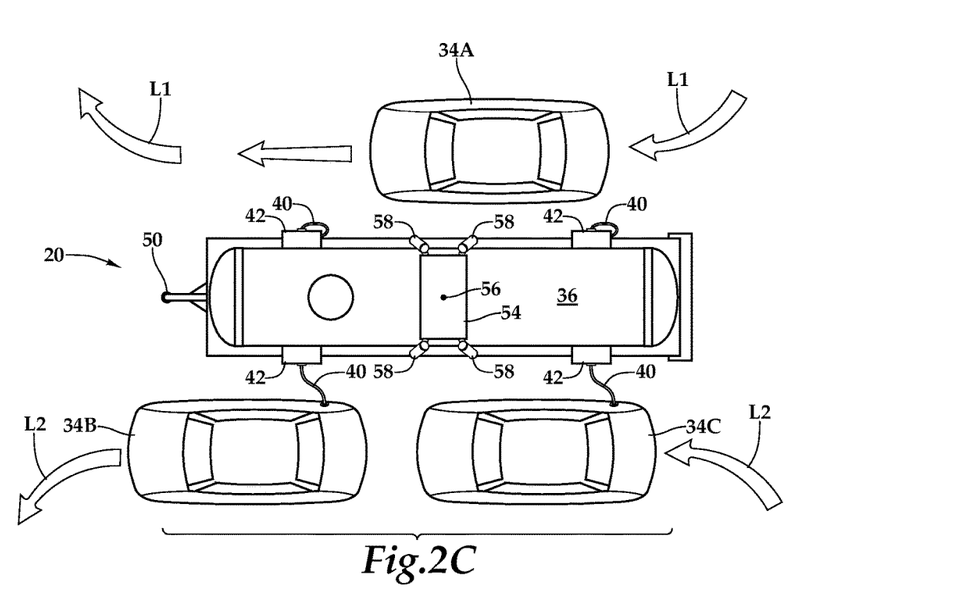
FIG. 2C is a partial top plan view illustrating one embodiment of the refilling station depicted in FIG. 2A.
Figure 3A:
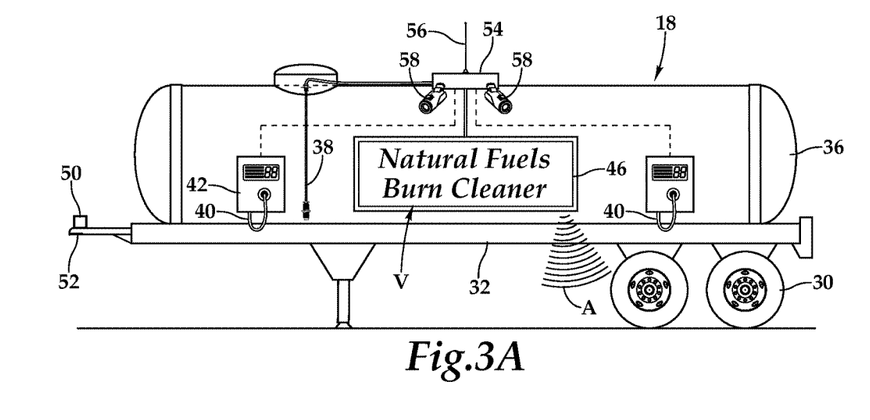
FIG. 3A is a right elevation view illustrating one embodiment of the semi-tractor trailer depicted in FIG. 2.
Figure 3B:
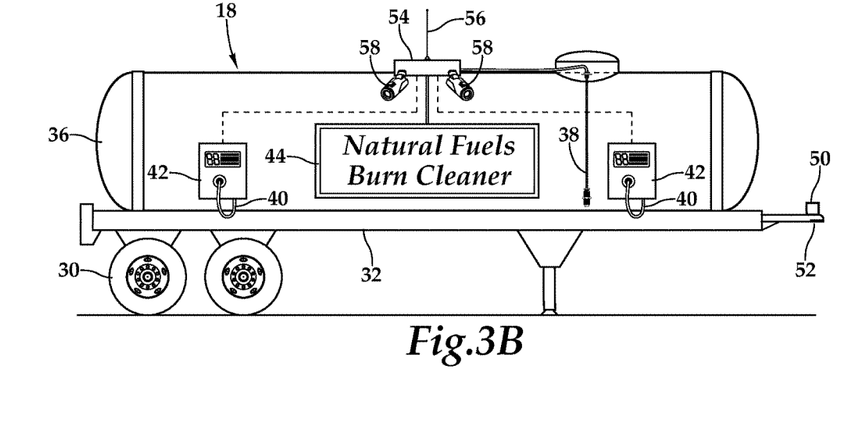
FIG. 3B is a left elevation view illustrating the semi-tractor trailer depicted in FIG. 3A.
Figure 3C:
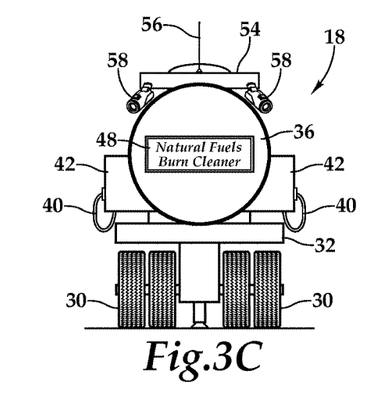
FIG. 3C is a front elevation view illustrating the semi-tractor trailer depicted in FIG. 3A.
Figure 3D:
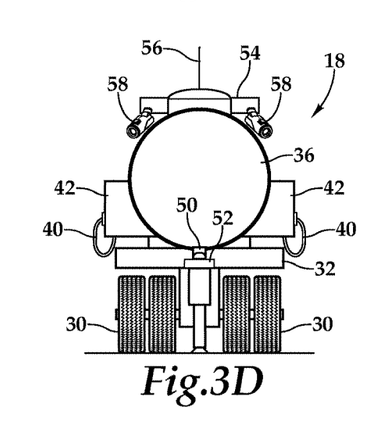
FIG. 3D is a rear elevation view illustrating the semi-tractor trailer depicted in FIG. 3A.

Referring initially to FIG. 1, therein is depicted a system for distributing clean natural gas, which is schematically illustrated and designate 10. In one embodiment, the system 10 includes a source of natural gas 12, which is coupled to a natural gas plant 14 that is configured to convert the natural gas into clean natural gas, which may include, but is not limited to, compressed natural gas and liquid natural gas. A clean natural gas retail distribution network 16 includes multiple clean natural gas tankers or semi-tractor trailers 18, which operate as mobile point-of-sale clean natural gas stations, at various dispensing locations 20, which may be considered locations at which clean natural gas is distributed. The clean natural gas retail distribution network 16, which includes a fuel container refilling location 26, is deployed to geographically overlap the natural gas plant 14 and population centers 22 in a manner that leverages the existing interstate highway network 24. With this implementation in mind, new infrastructure, such as pipelines, is not required. Rather the existing interstate highway network 24 is utilized for delivery. Moreover, new gas stations are not needed. Instead, the semi-tractor trailers 18 serve as mobile fuel delivering mechanisms.

In one embodiment, a capital distribution network is configured to distribute small business administration loans to businesses, which support the source of natural gas 12, natural gas plant 14, or natural gas retail distribution network 16. These clean natural gas industry partners may be, for example, gas field service industry entities, manufacturing support plants, or retrofit/conversion companies. In one implementation, the small business administration loans are sold to pension funds with geographic overlap relative to the capital distribution network. In this manner, public risk is mitigated.

As shown in FIG. 1, two refilling locations 26 are servicing vehicles traveling to and from population centers 22. At each of the refilling locations, one or more vehicles 34 are refueling. Additionally, a tractor in combination with a semi-tractor trailer 18 is in-route on the interstate highway 24 to replace an emptying semi-tractor trailer 18 with a full semi-tractor trailer 18.

Referring now to FIGS. 2A, 2B, 3A, 3B, 3C, and 3D, one embodiment of the semi-tractor trailer for distributing clean natural gas is presented and as previously numbered, is designated 18. Additionally, at refilling location 26 and empty semi-tractor trailer 18E is present. With regard to the semi-tractor trailer 18, multiple wheels 30 support an undercarriage 32 of the semi-tractor trailer 18, which is configured to move the semi-tractor trailer 18 between a location 20 at which the clean natural gas is dispensed to vehicles, such as vehicles 34, and a fuel container refilling location 26. A fuel container 36 is disposed on the undercarriage 32 and configured to hold the clean natural gas. A volume monitor 38 is located within the fuel container 36 in order to monitor the volume of clean natural gas in the fuel container 36. Fuel metering and dispensing units 40 are coupled to the fuel container 36 to simultaneously dispense metered quantities of clean natural gas to the vehicles 34. Multiple point-of-sale transaction units 42 are respectively associated with the fuel metering and dispensing units. The point-of-sale transaction units 42 are configured to accept credit cards to enable credit card clean natural gas purchasing transactions.

As shown, a driver side digital display 44 is mounted to the driver-side of the fuel container 36. A passenger side digital display 46 is mounted to the passenger-side of the fuel container 36 and a rear digital display 48 is mounted to the rear of the fuel container 36. In one embodiment, the three displays 44, 46, 48 have two operational modes. A first operational mode is configured to provide advertising relative to a fueling location 20 at which the clean natural gas dispensed from the semi-tractor trailer. The fueling location may be the location the semi-tractor is headed to or the closest location to the semi-tractor trailer, for example. In a second operational mode, the three displays 44, 46, 48 are configured to provide pricing details and vehicular movement instructions relative to a stationary location of the semi-tractor trailer. The pricing details and vehicular movement instructions may be audio-visual. The second operational mode may also include signage such as directional arrows, traffic pattern instructions, and placards. Both operational modes and all of the displays 44, 46, 48 may include visual information and audio information as represented in more detail in FIG. 3A, where the display 46 is set in the second operational mode. More particularly, as represented by the letter V, the visual portion of the display reads "Natural Fuels Burn Cleaner" to promote the use of the clean natural gas. Additionally, as represented by the letter A, an audio portion states "Natural Fuels Burn Cleaner" and "Clean Natural Gas Available Here." It should be appreciated that depending on the location and application, the visual and audio messaging provided by the displays 44, 46, 48 may vary. Further, the visual portion and the audio portion may be different or the same or a combination thereof.

Referring again to FIGS. 2A through 3D, the driver side digital display 44, the passenger side digital display 46, and the rear digital display 48 are in the first operational mode between the location 20 or locations at which the clean natural gas is dispensed to vehicles and the fuel container refilling location 26. On the other hand, the driver side digital display 44, the passenger side digital display 46, and the rear digital display 48 are in the second operational mode at the location 20 or locations at which the clean natural gas is dispensed.

An anti-theft device 50 is coupled to a king pin 52, which is affixed to the undercarriage 32 of the semi-tractor trailer 18. The king pin 52 may include a login and password type of access. In one embodiment, the anti-theft device 50 is configured, responsive to tampering, to transmit a distress signal via a central operations module 54 and a transceiver or an antenna 56. In one implementation, the anti-theft device 50 also includes strategically located cameras 58, which are mounted to the semi-tractor trailer 18. The central operations module 54 and the antenna 56, which is connected thereto, is also in communication with the volume monitor and periodically notifies the refilling location 26 of the volume remaining in the fuel container 36 of the clean natural gas.

In brief, in operation, as shown, a tractor 60 delivers a semi-tractor trailer 18 to a dispensing location 20 and after unhooking the semi-tractor trailer 18 and appropriately initializing the anti-theft measures 50, the tractor 60 may leave. Alternatively, as illustrated, if an empty semi-tractor trailer 18E, is present, the tractor 60 may leave with the empty semi-tractor trailer 18E and return the empty semi-tractor trailer 18 to the refilling location 26. As shown, once the semi-tractor trailer 18 is positioned, vehicles 34 may be filled. In particular, in FIG. 2C, vehicle 34A is utilizing lane L1, as represented by the vehicular movement arrows, and vehicles 34B and 34C are utilizing land L2, as represented by a second set of vehicular movement arrows. Additionally, as shown the vehicle 34A is leaving the refilling location 26 after a successful refueling operation, while the vehicles 34B, 34C are in the process of refueling as shown by the fuel metering and pumping units 40 being connected to the vehicles 34B, 34C.

Figure 4:
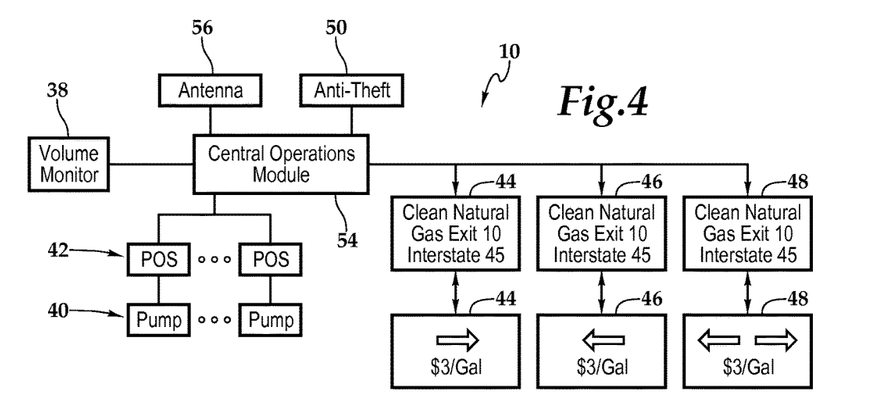
FIG. 4 is a functional block diagram illustrating one embodiment of modularized logic for supplying fuel to vehicles using the semi-tractor trailer presented herein.

FIG. 4 depicts one embodiment of modularized logic for supplying fuel to vehicles using the semi-tractor trailer presented herein. As shown, the central operations module 54 is connected to the fuel metering and dispensing units 40 and the corresponding point-of-sale units 42. The volume monitor 38 and antenna 56 are also connected to the central operations module 54. The various anti-theft apparatus 50 is also connected to the central operations module 54. As shown, the three displays 44, 46, 48 are controlled by the central operations module 54 as well. Further, as shown, in FIG. 4, the displays 44, 46, 48, in the first operational mode, may include advertising displaying the closest location of a clean natural gas distribution point. In this case, each of the displays 44, 46, read "Clean Natural Gas Exit 10 Interstate 45" to inform vehicles using the interstate highway system or other roadways with the in-route semi-tractor trailer, where the closest location may be found for the purchase of the clean natural gas. On the other hand, when the semi-tractor trailer is at a location dispensing clean natural gas, the displays are in a different operational mode, where as shown, various pricing information and vehicular movement directions, for example, may be provided. As shown, displays 44, 46, 48 have directional arrows and the stated price of "$3/gallon." The displays and the mode of operation and the specific presentation therefrom are controlled by the central operations module 54.

Figure 5:
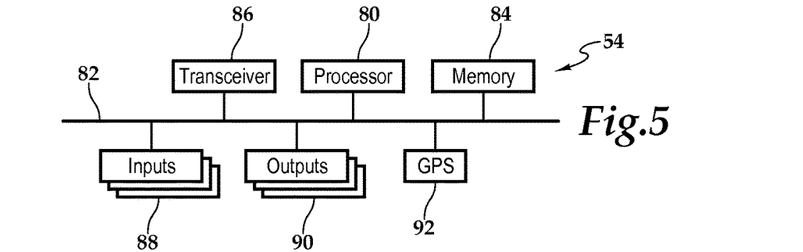
FIG. 5 is a functional block diagram illustrating one embodiment of a circuit, which executes a portion of the modularized logic presented in FIG. 4.

FIG. 5 depicts one embodiment of a circuit, which executes a portion of the modularized logic previously presented. In particular, a more detailed look at the central operations module 54 is presented wherein a processor 80 is coupled to a bus 82 and a memory 84, which may include storage, ROM, and/or RAM. A transceiver 86 and various inputs 88 and outputs 90 are also coupled to the bus 82. Additionally, a GPS circuit 92 is coupled to the bus 82. The inputs 88 and outputs include the various connections from the central operations module 54 to the volume monitor 38, point-of-sale units 42, fuel metering and pumping units 40, anti-theft measures 50, and the displays 44, 46, 48, for example. It should be appreciated that although a particular architecture is presented, other architectures and variations are within the scope of the teachings presented herein.

The memory 84 is accessible to the processor 80 and the memory 84 includes processor-executable instructions that, when executed, cause the processor 80 to poll the volume of clean natural gas in the fuel container by way of the fuel monitor. This data is transmitted via the transceiver 86 to the refilling location 26. The processor-executable instructions also cause the processor 80 to receive GPS data, including location, date/time data, from the GPS circuit 92. This GPS data is also transmitted via the transceiver 86 to the refilling location 26 or other location as designated from time-to-time. Moreover, the processor-executable instructions cause the processor 80 via the inputs 88 and outputs 90 to retrieve and process sales data from the point-of-sale units. This data is also provided to the refilling location 26. With the sales data, volume of fuel container data, and location data, the refilling location 26 and the operator may dynamically adjust the deployment of the fleet of semi-tractor trailers to increase sales and better respond to the market place.

Figure 6:
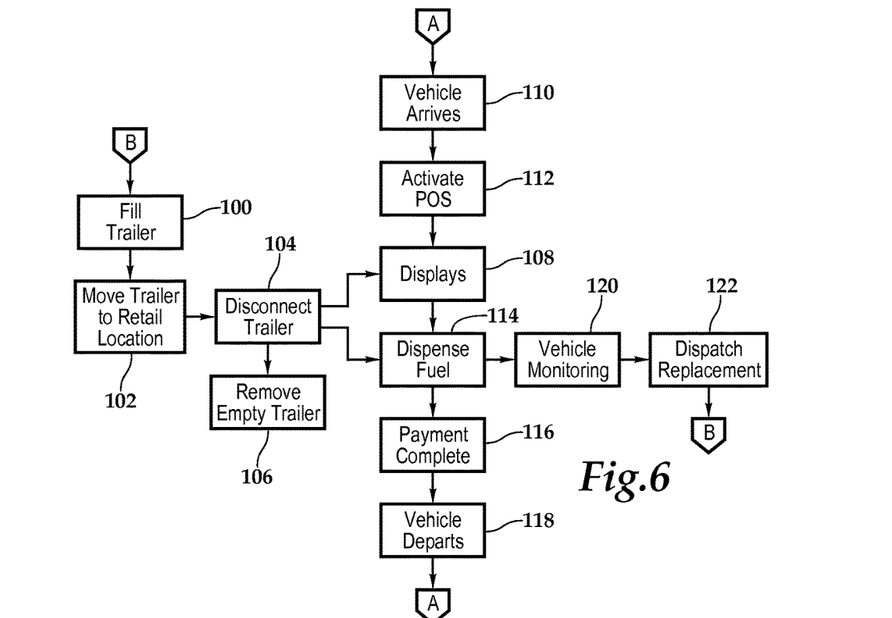
FIG. 6 is a functional block diagram illustrating one embodiment of a sequence of events in supplying fuel to vehicles using the semi-tractor trailer presented herein.

FIG. 6 depicts one embodiment of a sequence of events in supplying fuel to vehicles using the semi-tractor trailer presented herein. As previously alluded to, at block 100, a semi-tractor trailer is filled at a refilling location. The clean natural gas laden semi-tractor trailer is then moved utilizing the interstate highway system to a retail dispensing location, as shown at block 102. As previously mentioned, advertising of the retail dispensing location or a more proximate retail dispensing location occurs during transport. Next, at block 104, the semi-tractor trailer may be disconnected from the tractor for service and the tractor may leave, optionally, taking a empty semi-tractor trailer to the refilling location on a return trip, as shown at block 106.

As will be appreciated, no additional infrastructure is required. No underground pipes are required to locate the clean natural gas at the retail dispensing location. The semi-tractor trailer is transported using the existing interstate highway network. At block 108, the displays located on the sides at the rear of the semi-tractor trailer provide maneuvering and parking instructions with audio/visual indications. Additionally, various price and sales information is illustrated. At block 110, a vehicle is parked adjacent to the semi-tractor trailer at a fuel metering and dispensing unit have a point-of-sale unit. The vehicle may have been attracted by the advertising displayed on the road, when the semi-tractor trailer was in transit or, alternatively, the advertising on the semi-tractor trailer once the semi-tractor trailer was positioned at the dispensing unit. Alternatively, a driver of the vehicle may use an application on a smartphone to locate the clean natural gas distribution point.

At block 112, the point-of-sale unit is activated by a credit card, smartphone payment, or other conventional method. Fuel is dispensed into the vehicle tank as indicated at block 114. The payment is complete at block 116 and the vehicle departs the refilling location at block 118. As referenced by the return arrow, the process of vehicles arriving and departing continues. At block 120, the volume monitor within the semi-tractor trailer detects that the volume of the clean natural gas remaining in the fuel container is reaching a pre-determined threshold. At block 122, the refilling location dispatches a replacement semi-tractor trailer with a tractor by filling a fuel container. The methodology then returns to block 100 as indicated by the return arrow.

As will be appreciated, a first tractor may deliver the semi-tractor trailer to the location at which the clean gas is dispensed and a second or other tractor may retrieve the semi-tractor trailer from the location at which the clean gas is dispensed. In this manner, the point-of-sale unit and, more generally, the semi-tractor trailer, is independent of location and a GPS unit, which forms a portion of the semi-tractor trailer, determines the location of the clean natural gas transaction. Moreover, as part of a fleet or retail distribution network, each of semi-tractor trailers may be dynamically and selectively locatable at various mobile point-of-sale clean natural gas stations based on previous and projected GPS-based clean natural gas sales data. That is, the location of the mobile point-of-sale clean natural gas stations may be modified to increase sales by repositioning poor performing mobile point-of-sale clean natural gas stations. Or by way of additional example, if an event such a natural disaster is approaching, additional mobile point-of-sale clean natural gas stations may be deployed in an area that is safe and along an evacuation route, for example.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for facilitating the distribution of natural gas, the system comprising:
   a source of natural gas;
   a natural gas plant coupled to the source, the natural gas plant configured to convert the natural gas into clean natural gas;
   a clean natural gas retail distribution network including a plurality of semi-tractor trailers for distributing clean natural gas, the clean natural gas retail distribution network deployed to geographically overlap the natural gas plant and population centers, each of the plurality of semi-tractor trailers configured as mobile point-of-sale clean natural gas stations;

a capital distribution network configured to distribute small business administration loans to businesses which support at least one of the source of natural gas, natural gas plant, and natural gas retail distribution network; and a plurality of wheels supporting an undercarriage of the semi-tractor trailer, the plurality of wheels configured to move the semi-tractor trailer between a location at which the clean natural gas is dispensed to vehicles and a fuel container refilling location;

a fuel container disposed on the undercarriage, the fuel container configured to hold the clean natural gas;

a volume monitor located within the fuel container, the volume monitor configured to monitor the volume of clean natural gas in the fuel container;

a plurality of fuel metering and dispensing units coupled to the container for simultaneously dispensing metered quantities of clean natural gas to a plurality of vehicles;

a plurality of point-of-sale transaction units associated with the plurality of fuel metering and dispensing units, the plurality of point-of-sale transaction units configured to accept credit cards to enable credit card clean natural gas purchasing transactions;

a driver side digital display mounted to the driver-side of the fuel container;

a passenger side digital display mounted to the passenger-side of the fuel container;

a rear digital display mounted to the rear of the fuel container;

a first operational mode configured to provide advertising relative to a fueling location at which the clean natural gas dispensed of the semi-tractor trailer;

a second operational mode configured to provide pricing details and vehicular movement instructions relative to a stationary location of the semi-tractor trailer;

the driver side digital display, the passenger side digital display, and the rear digital display being in the first operational mode between the locations at which the clean natural gas is dispensed to vehicles and the fuel container refilling location;

the driver side digital display, the passenger side digital display, and the rear digital display being in the second operational mode at the locations at which the clean natural gas is dispensed; and an anti-theft device coupled to a king pin, the king pin being affixed to the undercarriage of the semi-tractor trailer, the anti-theft device configured, responsive to tampering, to transmit a distress signal.

2. The system as recited in claim 1, wherein the small business administration loans are sold to pension funds with geographic overlap relative to the capital distribution network.

3. The system as recited in claim 1, wherein the clean natural gas comprises a gas selected from the group consisting of liquid natural gas and compressed natural gas.

4. The system as recited in claim 1, wherein the volume monitor notifies the refilling location of the volume of the clean natural gas remains in the fuel container.

5. The system as recited in claim 4, wherein the refilling location dispatches a replacement semi-tractor trailer for distributing clean natural gas to the location at which the clean natural gas is dispensed upon the volume of the clean natural gas remaining in the fuel container reaching a pre-determined threshold.

6. The system as recited in claim 5, wherein a tractor delivers the replacement semi-tractor trailer to the location at which the clean natural gas is dispensed, the tractor retrieving the semi-tractor trailer to return the semi-tractor trailer to the refilling location.

7. The system as recited in claim 6, further comprising:
a first tractor delivers the semi-tractor to the location at which the clean gas is dispensed; and
a second tractor retrieves the semi-tractor from the location at which the clean gas is dispensed,
wherein the point-of-sale unit is independent of location and a GPS unit determines the location of the clean natural gas transaction.

8. A system for facilitating the distribution of natural gas, the system comprising:
a source of natural gas;
a natural gas plant coupled to the source, the natural gas plant configured to convert the natural gas into clean natural gas, the clean natural gas comprises a gas selected from the group consisting of liquid natural gas and compressed natural gas;
a clean natural gas retail distribution network including a plurality of semi-tractor trailers for distributing clean natural gas, the clean natural gas retail distribution network deployed to geographically overlap the natural gas plant and population centers, each of the plurality of semi-tractor trailers configured as mobile point-of-sale clean natural gas stations;
each of the plurality of semi-tractor trailers being dynamically and selectively locatable at the mobile point-of-sale clean natural gas stations based on previous and projected GPS-based clean natural gas sales data;
a capital distribution network configured to distribute small business administration loans to businesses which support at least one of the source of natural gas, natural gas plant, and natural gas retail distribution network; and
a plurality of wheels supporting an undercarriage of the semi-tractor trailer, the plurality of wheels configured to move the semi-tractor trailer between a location at which the clean natural gas is dispensed to vehicles and a fuel container refilling location;
a fuel container disposed on the undercarriage, the fuel container configured to hold the clean natural gas;
a volume monitor located within the fuel container, the volume monitor configured to monitor the volume of clean natural gas in the fuel container;
a plurality of fuel metering and dispensing units coupled to the container for simultaneously dispensing metered quantities of clean natural gas to a plurality of vehicles;
a plurality of point-of-sale transaction units associated with the plurality of fuel metering and dispensing units, the plurality of point-of-sale transaction units configured to accept credit cards to enable credit card clean natural gas purchasing transactions;
a driver side digital display mounted to the driver-side of the fuel container;
a passenger side digital display mounted to the passenger-side of the fuel container;
a rear digital display mounted to the rear of the fuel container;
a first operational mode configured to provide advertising relative to a fueling location at which the clean natural gas dispensed of the semi-tractor trailer;

a second operational mode configured to provide pricing details and vehicular movement instructions relative to a stationary location of the semi-tractor trailer;

the driver side digital display, the passenger side digital display, and the rear digital display being in the first operational mode between the locations at which the clean natural gas is dispensed to vehicles and the fuel container refilling location;

the driver side digital display, the passenger side digital display, and the rear digital display being in the second operational mode at the locations at which the clean natural gas is dispensed; and an anti-theft device coupled to a king pin, the king pin being affixed to the undercarriage of the semi-tractor trailer, the anti-theft device configured, responsive to tampering, to transmit a distress signal.

9. A system for facilitating the distribution of natural gas, the system comprising:

a natural gas plant coupled to a source of natural gas, the natural gas plant configured to convert the natural gas into clean natural gas;

a clean natural gas retail distribution network including a plurality of semi-tractor trailers for distributing clean natural gas, the clean natural gas retail distribution network deployed to geographically overlap the natural gas plant and population centers, each of the plurality of semi-tractor trailers configured as mobile point-of-sale clean natural gas stations;

a capital distribution network configured to distribute small business administration loans to businesses which support at least one of the source of natural gas, natural gas plant, and natural gas retail distribution network; and a plurality of wheels supporting an undercarriage of the semi-tractor trailer, the plurality of wheels configured to move the semi-tractor trailer between a location at which the clean natural gas is dispensed to vehicles and a fuel container refilling location;

a fuel container disposed on the undercarriage, the fuel container configured to hold the clean natural gas;

a volume monitor located within the fuel container, the volume monitor configured to monitor the volume of clean natural gas in the fuel container;

a plurality of fuel metering and dispensing units coupled to the container for simultaneously dispensing metered quantities of clean natural gas to a plurality of vehicles;

a plurality of point-of-sale transaction units associated with the plurality of fuel metering and dispensing units, the plurality of point-of-sale transaction units configured to accept credit cards to enable credit card clean natural gas purchasing transactions;

a driver side digital display mounted to the driver-side of the fuel container;

a passenger side digital display mounted to the passenger-side of the fuel container;

a rear digital display mounted to the rear of the fuel container;

a first operational mode configured to provide advertising relative to a fueling location at which the clean natural gas dispensed of the semi-tractor trailer;

a second operational mode configured to provide pricing details and vehicular movement instructions relative to a stationary location of the semi-tractor trailer;

the driver side digital display, the passenger side digital display, and the rear digital display being in the first operational mode between the locations at which the clean natural gas is dispensed to vehicles and the fuel container refilling location;

the driver side digital display, the passenger side digital display, and the rear digital display being in the second operational mode at the locations at which the clean natural gas is dispensed; and an anti-theft device coupled to a king pin, the king pin being affixed to the undercarriage of the semi-tractor trailer, the anti-theft device configured, responsive to tampering, to transmit a distress signal.

10. The system as recited in claim 9, wherein the small business administration loans are sold to pension funds with geographic overlap relative to the capital distribution network.

11. The system as recited in claim 9, wherein the clean natural gas comprises a gas selected from the group consisting of liquid natural gas and compressed natural gas.

12. The system as recited in claim 9, wherein the volume monitor notifies the refilling location of the volume of the clean natural gas remains in the fuel container.

13. The system as recited in claim 9, wherein the refilling location dispatches a replacement semi-tractor trailer for distributing clean natural gas to the location at which the clean natural gas is dispensed upon the volume of the clean natural gas remaining in the fuel container reaching a pre-determined threshold.

14. The system as recited in claim 9, wherein a tractor delivers the replacement semi-tractor trailer to the location at which the clean natural gas is dispensed, the tractor retrieving the semi-tractor trailer to return the semi-tractor trailer to the refilling location.

15. The system as recited in claim 9, further comprising:
a first tractor delivers the semi-tractor to the location at which the clean gas is dispensed; and
a second tractor retrieves the semi-tractor from the location at which the clean gas is dispensed,
wherein the point-of-sale unit is independent of location and a GPS unit determines the location of the clean natural gas transaction.

* * * * *